United States Patent [19] [11] 3,829,698
Goetz [45] Aug. 13, 1974

[54] X-RAY APPARATUS WITH IMPROVED FILM CASSETTE CLAMPING AND SIZE SENSING MEANS

[75] Inventor: Jerry E. Goetz, Shaker Heights, Ohio

[73] Assignee: Picker Corporation, Cleveland, Ohio

[22] Filed: Dec. 26, 1972

[21] Appl. No.: 318,414

[52] U.S. Cl.................. 250/468, 250/511, 250/521
[51] Int. Cl. .......................................... G03b 41/16
[58] Field of Search ........... 250/511, 512, 513, 521, 250/468

[56] References Cited
UNITED STATES PATENTS
3,457,406   7/1969   Reiniger.............................. 250/521
3,502,878   3/1970   Stewart............................... 250/512

Primary Examiner—James W. Lawrence
Assistant Examiner—C. E. Church
Attorney, Agent, or Firm—Watts, Hoffmann, Fisher & Heinke, Co.

[57] ABSTRACT

A pair of clamps interconnected by a pulley and cable system including substantially inextensible cables clamp opposite side regions of an X-ray film cassette. A locking mechanism serves to prevent retractive movement of the clamps and to urge them firmly into engagement with the film cassette to hold it in alignment with an X-ray beam axis. The cables have spaced parallel reaches defining an unobstructed central region therebetween for phototiming control of the X-ray exposure. One of the interconnecting cables is reeved around a pulley connected to an electrical signal means for providing a signal representative of the size of a cassette being clamped.

21 Claims, 9 Drawing Figures

X-RAY APPARATUS WITH IMPROVED FILM CASSETTE CLAMPING AND SIZE SENSING MEANS

CROSS REFERENCE TO RELATED PATENT AND APPLICATION

AUTOMATIC SHUTTER CONTROL, U.S. Pat. No. 3,643,095, issued Feb. 15, 1972 to Ronald F. Shuster, referred to here as the Shutter Control Patent.

PHOTO-TIMER, Ser. No. 157,536, filed June 28, 1971 by Edward Slagle, referred to here as the Photo Timer Patent.

BACKGROUND OF THE INVENTION

1. Field of the Invention

This invention relates to X-ray apparatus and more particularly to a novel and improved X-ray film cassette positioning device of the type known as a Bucky tray.

2. Description of the Prior Art

In known types of medical X-ray aparatus, radiation from an X-ray tube passes through a collimator assembly, then through a portion of the body of a patient under examination, and impinges on an X-ray sensitive film. The collimator assembly is provided with opposed pairs of movable shutters which define a rectangular opening of adjustable size.

The X-ray sensitive film is ordinarily positioned in a light-tight cassette. The cassette is provided with a pair of intensifier screens which emit visible light upon exposure to X-radiation to hasten the film exposure, thereby minimizing the patient's exposure to radiation.

In conducting a variety of studies, it is desirable to use films of various sizes so that the smallest suitable film is used for each exposure to minimize both radiation exposure and film cost. Accordingly, X-ray cassettes of a variety of sizes are available for use with various film sizes. The cassettes are supported for positioning within the X-ray beam on a positioning device called a Bucky tray which is movably carried by the body of an X-ray table.

Ideally, the technician selects the smallest film size which can be used and still cover the required viewing area. He then carefully positions a cassette containing such a film size in alignment with the X-ray beam axis and adjusts the collimator shutters to delineate the perimeter of the X-ray beam so that the dimensions of the beam impinging on the film correspond to that of the selected film size. This procedure minimizes the exposure of the patient to unnecessary radiation.

The Shutter Control Patent describes a collimator system which adjusts itself automatically to the appropriate setting according to the size of the selected film cassette and the tube-to-film distance. The present invention provides a Bucky tray with an improved X-ray cassette size-sensing system which can be used in conjunction with the automatic collimation system of the referenced application to provide a signal representative of a dimension of a film cassette being clamped.

Known Bucky tray constructions typically clamp film cassettes on the two opposite sides which parallel the longitudinal dimension of the table body. Where the Bucky tray is used in a generally horizontal attitude, such one-dimensional clamping arrangements are ordinarily adequate to hold the cassette. However, when the X-ray table body is tilted to, for example, shift the patient from a prone to an erect position, the X-ray cassette, being relatively heavy device, tends to slide longitudinally of the table and out of alignment with the X-ray beam unless the cassette is very firmly clamped in place by the Bucky tray.

In order to compensate for the tendency of film cassettes to slide longitudinally of the table and out of alignment with the X-ray beam axis, some X-ray technicians use larger than necessary film sizes and open up the collimator to larger than necessary field sizes to assure full exposure of the film. This procedure exposes the patient to a substantially greater than necessary quantity of radiation. As will be appreciated, the apparatus of the referenced Shutter Control Patent will not overcome this problem since, if the technician chooses a large film size in order to compensate for cassette slippage, the automatic collimator will provide a corresponding large beam field size.

Known cassette clamping systems have a pair of clamps interconnected by a relatively complex linkage for moving the clamps in unison toward and away from each other. The interconnecting linkages ordinarily have some play even when in perfect adjustment. After periods of extended use, the interconnecting linkages may develop sufficient additional play to defeat the clamping action of the system. Some known linkage interconnection systems also take up, to a large degree the central region beneath the clamped film cassette. This prevents the use of a phototimer of the type described in the Photo Timer Patent with its light-conductive paddle centered beneath the Bucky tray.

SUMMARY OF THE INVENTION

The present invention overcomes the foregoing drawbacks of the prior art and provides a film cassette clamping system which is operable to receive and firmly clamp opposite sides of X-ray film cassettes of the wide range of sizes and length-to-width dimension ratios without obstructing the central region beneath the cassette.

Known clamping systems have play in their interconnecting linkages, which prevents firm and positive clamping. The clamping system of this invention has improved clamping characteristics over prior clamping linkages because the opposed clamping member are interconnected by a length of substantially inextensible cable. The present system provides a more effective clamping device because none of the clamping action is consumed in eliminating play from the system. As the clamping members are tensioned against the film cassette, by a locking mechanism, all of the travel of the locking mechanism is utilized to firmly grip the film cassette, thereby preventing shifting of the film cassette when the X-ray table is tilted.

The locking mechanism is carried by one of the clamps. Once the clamps are brought into engagement with the sides of a film cassette to be clamped, a lever on the locking mechanism is turned to initiate the locking action. The rotation of the lever first locks the clamps against retractive movement away from the cassette, then urges the clamps firmly against the film cassette. Since there is substantially no play in the cable system interconnecting the clamps, none of this locking action is lost in taking up play.

An electrical signal device connects with the cable interconnecting the opposed clamping members to provide an electrical signal representative of a dimension of the film cassette being clamped. The signal can be utilized by automatic collimation control systems of the type described in the Shutter Control Patent.

The cable and pulley system which interconnects the clamps includes preferably a pair of cables having reaches extending across the underside of the Bucky tray and disposed outwardly of a central phototiming region to provide an unobstructed region for the input windows of a phototimer.

One of the interconnecting cables is reeved around a pulley connected to an electrical signal mechanism such as a variable potentiometer. Since the cable rotates the pulley only in response to movement of the clamps, the resistance of the potentiometer is varied in accordance with the distance between the clamps. When a film cassette is clamped, the potentiometer provides an electrical signal representative of a dimension of the cassette between the clamps.

Accordingly, it is a general object to provide a novel and improved X-ray film cassette positioning system to receive and firmly clamp X-ray film cassettes of a wide range of sizes.

Other objects and a fuller understanding of the present invention may be had by referring to the following description and claims taken in conjunction with the accompanying drawings.

DESCRIPTION OF THE PREFERRED EMBODIMENT

Figure 1:
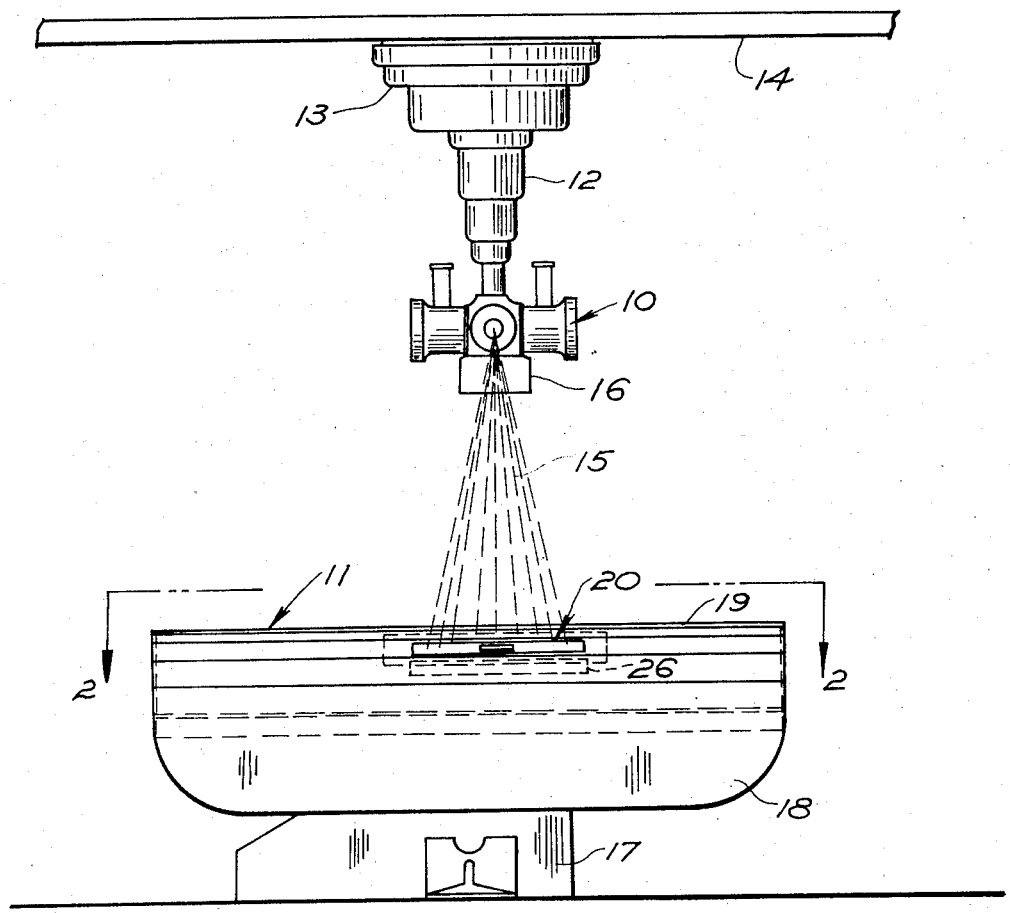
FIG. 1 is a side elevational view of an X-ray apparatus including the novel and improved film cassette clamping system of the present invention.

Referring to FIG. 1, an X-ray apparatus is shown including an X-ray tube housing 10 mounted above an examination table 11. A telescopic column 12 supports the tube housing 10 from a carriage 13 to permit vertical movement of the tube housing 10 relative to the carriage 13. A ceiling mounted stationary track structure 14 movably supports the carriage 13 such that the tube housing 10 can be moved longitudinally and transversely of the table 11 to arrive at any desired position above the examination table 11.

An X-ray tube, not shown, is positioned within the housing 10. X-radiation emanating from the tube in the form of a beam 15 passes through a collimator 16 which delineates the perimeter of the X-ray beam to a rectangular configuration.

The table 11 includes a pedestal or base 17 and a body 18 which is tiltable relative to the base 17. The body 18 includes a patient-supporting top surface 19 upon which patients are positioned one at a time for examination.

Figure 2:
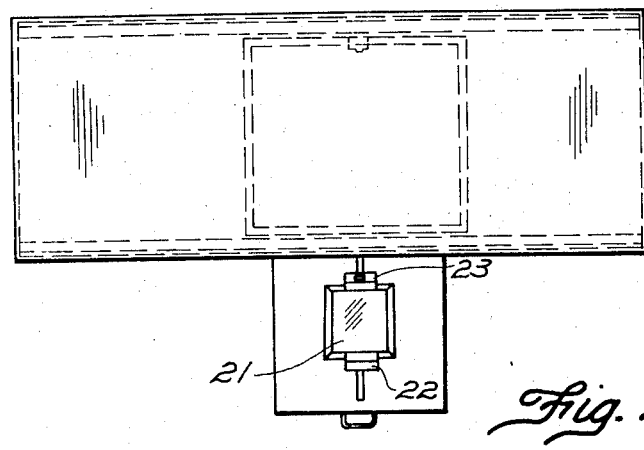
FIG. 2 is a top plan view of the X-ray table shown in FIG. 1 with the Bucky tray projecting outwardly of the table and carrying a film cassette.

A Bucky tray 20 is supported for longitudinal movement beneath the top surface 19. The Bucky tray 20 is also movable transversely of the table top 19, as shown in FIG. 2, for loading and unloading an X-ray film cassette 21.

In accordance with the present invention, an opposed pair of clamps 22, 23 are movable toward and away from opposite sides of the film cassette 21 to firmly engage and clamp opposite sides of the cassette. A phototimer 26 such as is described in the referenced Photo Timer Patent, is mounted beneath the Bucky tray 20. The clamps 22, 23 and interconnecting pulley and cable linkage systems are all disposed perimetrically of a centrally-disposed area 140. By this arrangement, phototimer input paddles such as the paddle 26a shown in FIG. 4 can be disposed beneath the central area 140 to receive radiation passing through the film cassette.

In operation, a patient is positioned on the table top 19 and the X-ray tube housing 10 is moved into position over the portion of the patient to be examined. A film cassette 21 of minimum required size is positioned in the Bucky tray 20 and clamped firmly in place. The Bucky tray is moved into position with the film cassette centered along the X-ray beam axis. The collimator 16 is adjusted either manually or automatically such that the perimeter of the beam corresponds to the perimeter of the film in the cassette 21. The film is then exposed by X-radiation for a period of time as controlled by the phototimer 26.

Figure 3:
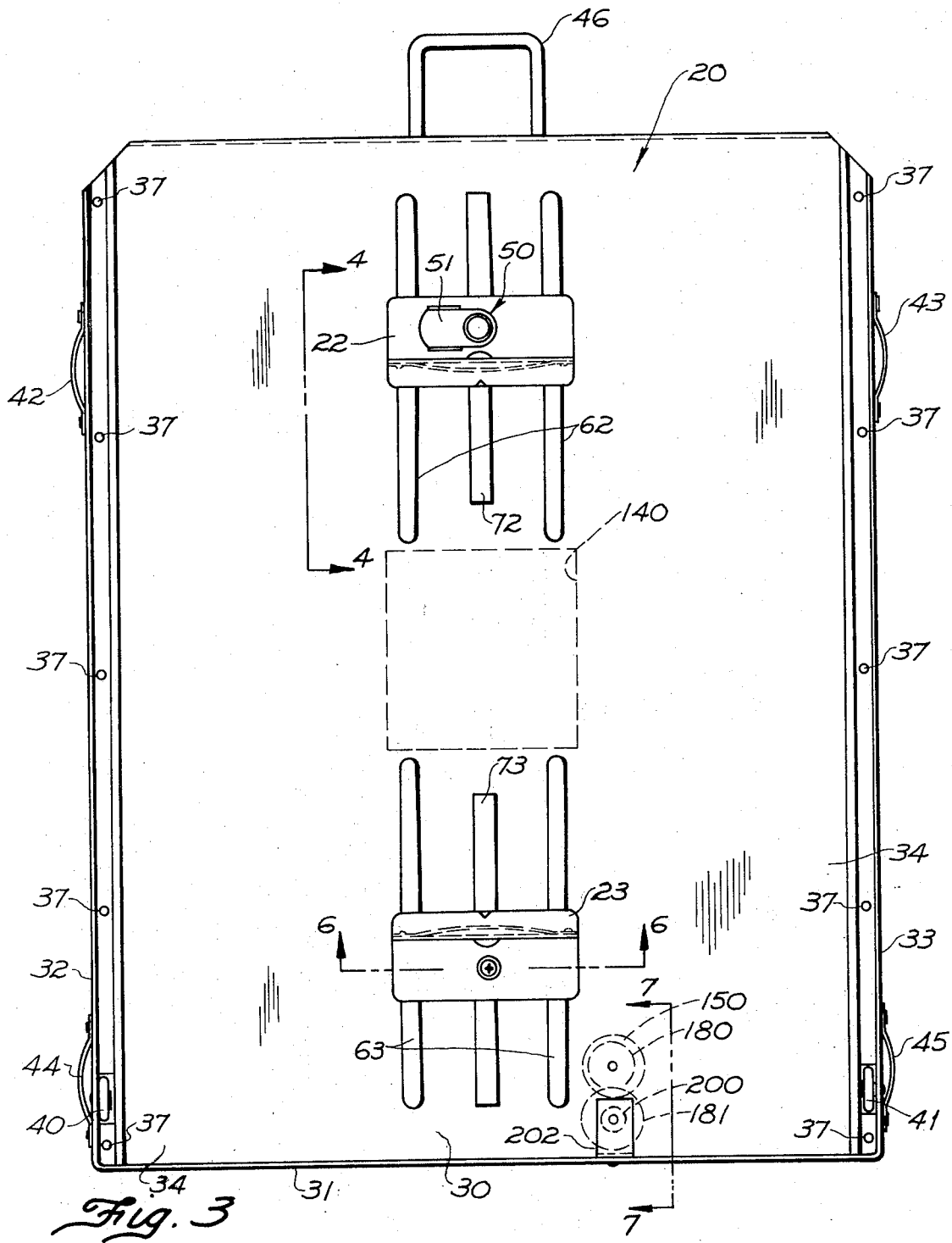
FIG. 3 is an enlarged top plan view of the Bucky tray.
Figure 4:
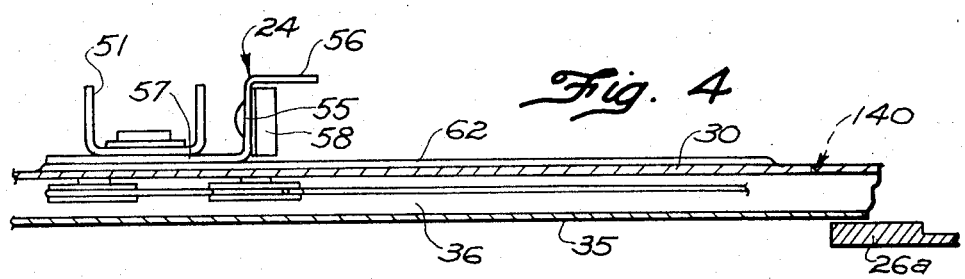
FIG. 4 is an enlarged cross-sectional view as seen from the plane indicated by the line 4—4 of FIG. 3.

Referring to FIGS. 3 and 4, the Bucky tray 20 includes a mounting plate 30 and a bottom cover plate 35 secured together along mating peripheral regions by rivets 37. The mounting plate 30 has upwardly-extending back and side walls 31 and 32, 33. A central region 34 of the plate 30 is raised to define a compartment 36 between the plates 30, 35.

In conventional fashion the tray 20 is provided with a pair of supporting rollers 40, 41; two pairs of side mounted leaf springs 42, 43 and 44, 45; and a handle 46. Together these components 40 – 46 facilitate and guide the inward and outward positioning of the tray 20 beneath the table top 19.

The clamps 22, 23 each include a bracket of a Z-shaped cross section which slides on raised ribs formed in the plate 30. As is best seen in FIG. 3, pairs of spaced raised ribs 62, 63 are formed in the plate 30 for supporting the clamps 22, 23 respectively. Referring to FIG. 4 where the clamp 22 is shown in side view, it is seen that a bracket of Z-shaped cross-section is formed by upper and lower flanges 56, 57 connected by an integral web 55.

The upper flange 56 serves to overlie the rim of a film cassette when the clamp 22 is brought into engagement with the cassette. The web 55 carries a resilient leaf spring 58 which engages the side of a film cassette. The lower flange 57 slides along the raised ribs 62.

Figure 5:
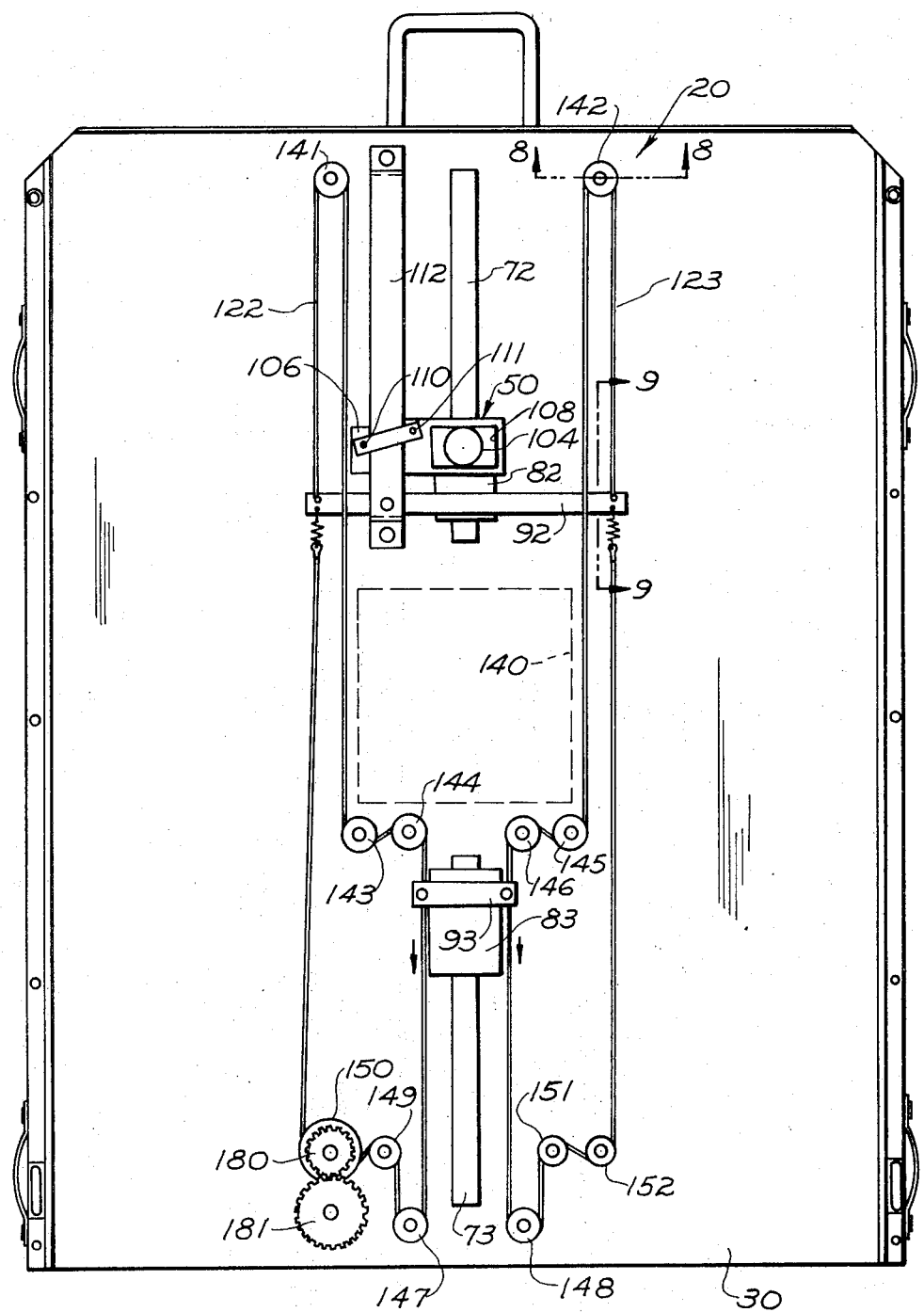
FIG. 5 is a bottom plan view of the Bucky tray with the lower cover thereof removed.

Two guide slots 72, 73 are provided in the plate 30 between the ribs of each pair of ribs 62, 63 respectively. Referring to FIG. 5, plates 82, 83 are positioned beneath the slots 72, 73 and mount crossbars 92, 93. As will be explained, the plates 82, 83 are secured to guide structures positioned in the slots 72, 73, which are, in turn, secured to the clamps 22, 23. By this arrangement, the crossbars 92, 93 are rigidly secured to the clamps 22, 23, for concurrent movement therewith in directions parallel to the slots 72, 73. As will also be explained, the crossbars 92, 93 are interconnected by a pulley and cable system which effects concurrent movement of the clamps 22, 23 toward and away from each other.

Figure 6:
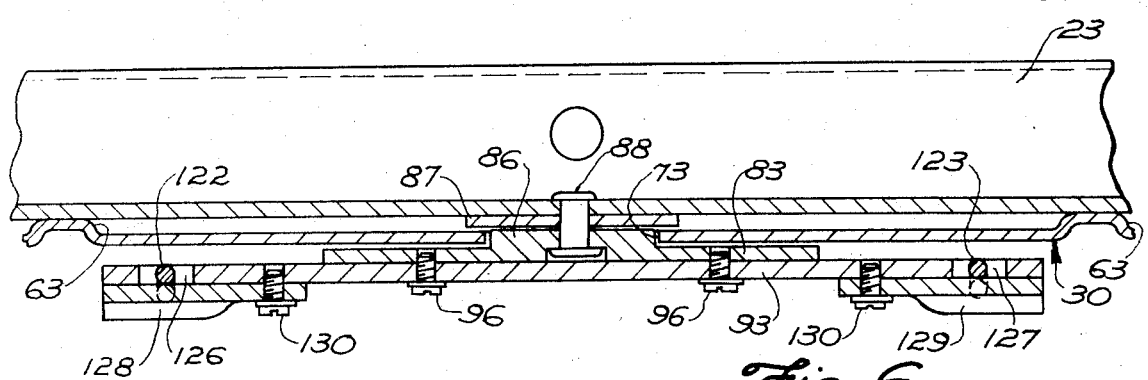
FIG. 6 is an enlarged cross-sectional view as seen from the plan indicated by the line 6—6 in FIG. 3.

Referring to FIG. 6, the connection between the clamp 23 and the plate and crossbar 83, 93 is illustrated. The plate 83 has an elongated raised rectangular projection which is slip fitted within the slot 73. Interposed between the bottom flange of the clamp 23 and the projection 86 is a spacer 87. Rivets 88 extend through the bottom flange of the clamp 23, through the spacer 86 and through the plate 83 to secure these member together. Screws 96 extend through apertures formed in the crossbar 93 and into threaded apertures formed in the plate 83 to rigidly mount the crossbar 93 on the plate 83.

The clamp 22 is provided with a locking mechanism 50 including a pivotally mounted lever 51 which is operable to lock the clamp 22 in place. As will be explained, since the clamps 22, 23 are interconnected for concurrent movement, the locking mechanism 50 is also operable to lock the clamp 23.

The locking mechanism 50, as shown in FIG. 5, includes an eccentric or cam 104, which is coupled to the lever 51, for rotation therewith. A locking plate 106 having a rectangular aperture 108 journals the eccentric 104. Rotation of the eccentric 104 in a counterclockwise direction as viewed in FIG. 5 will serve to cock the locking plate 106 in a counterclockwise direction. Such cocking of the locking plate 106 serves to wedge a pair of locking pins 110, 111 against opposite sides of a strap 112 mounted on the underside of the plate 30.

In operation, the clamps 22, 23 are brought into engagement with the sides of a film cassette. The lever 51 is then rotated clockwise as viewed in FIG. 3 to rotate the eccentric 104 counterclockwise as viewed in FIG. 5. This rotation of the eccentric 104 cocks the plate 106 and brings the pins 110, 111 into firm engagement with the sides or the strap 112, thereby locking the clamps 22, 23 from retractive movement away from the film cassette. Further rotation of the lever 51 then forces the clamps 22, 23 into tight locking engagement with the film cassette. Due to the inextensible nature of the cable system which interconnects the clamps 22, 23, there is virtually no play in the clamping system and none of the movement of the locking mechanism 50 is lost in taking up play as in prior art clamping systems. The clamps 22, 23 are released by counter-rotating the lever 51.

The cable and pulley system which interconnects the crossbar 92 with the crossbar 93 comprises a pair of cables 122, 123. Referring to FIG. 6, the cables 122, 123 pass under the crossbar 93. Portions of the cables 122, 123 are deflected upwardly and into apertures 126, 127 formed in the cross bar 93 by a pair of ribbed clamping brackets 128, 129 so as to securely clamp the cables 122, 123 to the cross bar 93. Screws 130 extend through apertures in the clamping brackets 128, 129 and into threaded apertures in the crossbar 93 to hold the clamping brackets 128, 129 in place on the crossbar.

Figure 9:
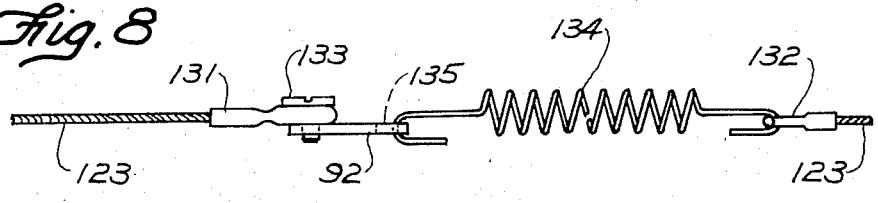

The interconnections of the cables 122, 123 with the crossbar 92 is illustrated in FIG. 9. Apertured end clamps 131, 132 are connected to the opposite ends of the cable 123. A screw 133 extends through the apertured end clamp 131 and is threaded into an aperture formed in the crossbar 92 to secure one end of the cable 123 to the crossbar 92. The end clamp 132 is resiliently coupled to the crossbar 92 by means of a tension coil spring 134. One end of the spring 134 is looped through the apertured end clamp 132. The other end of the spring 134 is looped through an aperture 135 formed in the crossbar 92.

In accordance with the present invention, the cables 122, 123 are reeved around a series of idler pulleys along the underside of the plate 30 in such a fashion as to leave a relatively large space 140 between the cables. Since the space 140 is uncluttered by any sort of moving mechanism, it can be used by the phototimer 26 positioned beneath the Bucky tray 20 in the table body 18 for the positioning of phototiming input windows which receive X-radiation passing through the film cassette 21.

The cables 122, 123 are reeved around pulleys 141, 142 near the front edge of the tray 20, around pairs of pulleys 143, 144 and 145, 146 near one edge of the space 140, around pulleys 147, 148 near the back of the tray 20, and around pairs of pulleys 149, 150 and 151, 152. The pulleys 141, 150 and 142, 152 define reaches of the cables 122, 123 which are connected, as described, to the crossbar 92. The pulleys 144, 147 and 146, 148 define reaches of the cables 122, 123 which are connected, as described, to the crossbar 93.

The pulley 150 has a pinion gear 180 formed integrally therewith. The gear 180 engages a pinion gear 181 which, as will be described, is mounted on the control shaft of a variable potentiometer. By this arrangement, as the cable 122, is moved and the pulley 150 rotates, the resistance of the variable potentiometer is changed so as to provide an electrical signal representative of the distance between the clamps 22, 23.

The cable 122 is double wrapped around the pulley 150 and may be rigidly secured to the pulley 150, to positively assure that the cable 122 does not slip relative to the pulley 150.

Figure 8:
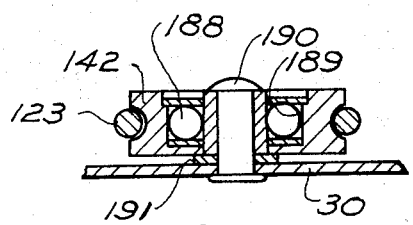
FIG. 8 is an enlarged cross-sectional view as seen from the plane indicated by the line 8—8 in FIG. 5; and, FIG. 9 is an enlarged elevational view as seen from the plane indicated by the line 9—9 in FIG. 5.

Except for the pulley 150, the various described pulleys around which the cables 122, 123 are reeved are supported from the plate 30 in the manner shown in FIG. 8. Referring to FIG. 8, the pulley 142 has a ball bearing 188 press fitted into a cylindrical recess 189 formed in the pulley. A rivet 190 extends through the ball bearing 188 and through the plate 30 so as to mount the pulley 142 on the plate 30. A washer 191 is mounted on the rivet 190 at a position between the pulley 142 and the plate 30.

Figure 7:
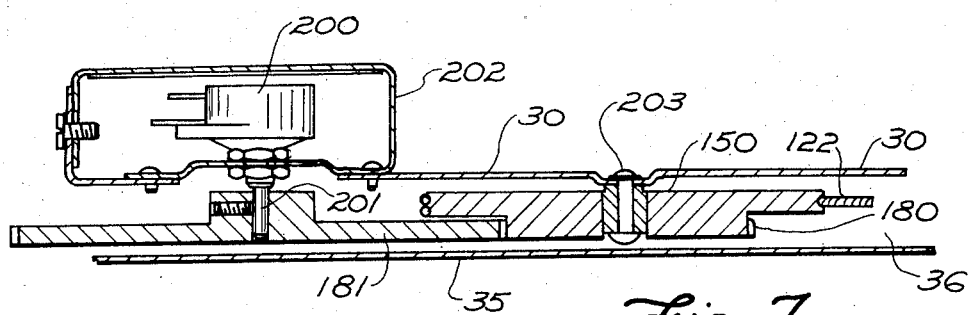
FIG. 7 is an enlarged cross-sectional view as seen from the plane indicated by the line 7—7 in FIG. 3.

Referring to FIG. 7, a potentiometer 200 has a control shaft 201 which mounts the gear 181. The potentiometer 200 is supported by a housing structure 202 secured to the plate 30. The integrally-formed combination of gear 180 and pblley 150 is secured to the plate 30 by a rivet 203. As the cable 122 is moved around the pulley 150, the meshed gears 180, 181 effect concurrent rotation of the potentiometer control shaft 201. By this arrangement, the resistance of the potentiometer 200 is varied in accordance with the position of the clamps 22, 23.

The potentiometer 200 accordingly provides a means for generating an electrical signal representative of one dimension of a cassette which is clamped by the clamps 22, 23. Such a signal can be used in conjunction with such automatic collimator shutter control means as is described in the Shutter Control Patent to provide a system which automatically delineates the X-ray beam perimeter to correspond with the size of an X-ray cassette being used.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. For use in an X-ray apparatus of the type including a source of X-rays for emitting a delineated beam of X-radiation along a path toward an object, a device for receiving and supporting X-ray film cassettes of a range of sizes one at a time within the beam path comprising:

a. a support structure defining a cassette positioning space where a cassette may be positioned, the cassette space when the apparatus is in use being in an X-ray beam path such that a supported cassette is transverse to the beam;
   b. a pair of clamping means movably carried by said support structure for movement across said support structure for releasably engaging opposite side regions of a generally rectangular film cassette positioned in the space;
   c. interconnection means interconnecting the clamping means for concurrent movement toward and away from each other; and,
   d. said interconnection means defining an open space aligned with and generally centered with respect to said cassette space along an X-ray beam path whereby X-radiation passing centrally through the film cassette and thence to a phototimer paddle or the like is not interfered with by said interconnection means.

2. The apparatus of claim 1 wherein said interconnection means comprises pulley and cable means interconnecting the clamping means for concurrent movement toward and away from each other.

3. The X-ray apparatus of claim 2 additionally including at least one phototimer input window disposed in said open space and said pulley and cable means being disposed perimetrally of said input window.

4. The apparatus of claim 1 wherein said interconnection means includes at least one cable interconnecting said pair of clamping means, said cable being reeved around a pulley which drivingly connects with an electrical signal means for varying an electrical signal in response to the position of said cable as an indication of the position of said clamping means, whereby when a cassette is clamped by said clamping means said signal means provides an indication of the size of the cassette being clamped.

5. The apparatus of claim 4 wherein said pulley drivingly connects with the control shaft of a variable potentiometer for varying the resistance thereof in correspondence to the spacing between said pair of clamping means.

6. The apparatus of claim 1 wherein said support structure includes a plate member having guide slots formed therethrough for receiving portions of said clamping means and guiding their movement, said plate member defining a cassette supporting surface on one side thereof, and said interconnection means comprises pulley and cable means being disposed on the opposite side of said plate.

7. The apparatus of claim 6 wherein said pulley and cable means includes at least one substantially inextensible cable interconnecting said clamping means.

8. The apparatus of claim 7 wherein said pulley and cable means includes a pair of substantially inextensible cables interconnecting said clamping means.

9. The apparatus of claim 8 wherein said cables have spaced reaches paralleling the direction of movement of said clamping means, said spaced reaches serving to define said open space therebetween.

10. The apparatus of claim 9 wherein said cables are disposed substantially within a common plane to minimize the thickness of said interconnection means.

11. In an X-ray apparatus of the type including a source of X-rays for emitting a delineated beam of X-radiation along a path toward an object, the improvement of a device for receiving and supporting X-ray film cassettes of a range of sizes one at a time within the beam path so as to receive X-radiation passing through the object, comprising:

a. a pair of clamps;
   b. support structure movably supporting said clamps for movement toward and away from each other for releasably engaging opposite side regions of a film cassette positioned therebetween;
   c. a pulley and cable system interconnecting said clamps for concurrent movement toward and away from each other; and,
   d. said pulley and cable system including locking and cam means fixing the clamps against retractive movement after they have been brought into engagement with a cassette and thereafter tensioning the pulley and cable system to force the clamps into tight retentive engagement with a cassette.

12. The apparatus of claim 11 wherein:

a. said support structure includes a plate defining generally planar surface portions on one side thereof for engaging one face of an X-ray film cassette;
   b. said clamps are movably supported for holding a cassette on said one side of said plate;
   c. said pulley and cable system is disposed on the other side of said plate; and,
   d. said pulley and cable system and said clamps are connected through slots formed in said plate.

13. The apparatus of claim 12 wherein at least one substantially inextensible cable interconnects said clamps, said one cable having reaches disposed generally parallel to the directions of movement of said clamps.

14. The apparatus of claim 13 wherein said cable reaches are disposed substantially within the same plane.

15. The apparatus of claim 11 additionally including an electrical signal means coupled to said pulley and cable system for varying an electrical signal in response to the positioning of said clamps so as to provide a signal representative of the size of an X-ray film cassette clamped by said clamps.

16. In combination:
 a. an X-ray apparatus including X-ray source means for emitting a delineated beam of X-radiation along a path toward an object;
 b. cassette supporting and clamping assembly defining a cassette receiving space in said beam path; said assembly being adapted to receive, support and clamp X-ray film cassettes of a range of sizes one at a time in said space;
 c. phototimer input means positioned to receive at least a portion of the radiation passing through the cassette space;
 d. said supporting and clamping assembly comprising:
   i. a support defining surfaces for engaging a film cassette and supporting the cassette in the space with film in the cassette in a plane generally perpendicular to the X-ray beam path;
   ii. a pair of clamps movably carried by said support for movement across said surfaces toward and away from said space for releasably engaging opposed side regions of a positioned cassette; and,
   iii. interconnection means disposed perimetrally of said phototimer input means and interconnecting said clamps for concurrent movement toward and away from each other.

17. An X-ray film cassette supporting and clamping device, comprising:
 a. support structure defining a cassette positioning space for receiving and supporting an X-ray film cassette;
 b. a pair of clamps movably carried by said support structure for releasably engaging opposed side regions of a film cassette positioned in said space;
 c. a pulley and cable interconnecting system including at least one length of relatively inextensible cable coupled to both of said clamps to provide for the concurrent movement of said clamps toward and away from each other substantially without play;
 d. locking means interposed between one of said clamps and said support structure for releasably securing said one clamp to said support structure; and,
 e. said locking means being operative, once said pair of clamps is brought into engagement with opposite sides of a film cassette, to urge said one clamp firmly against the film cassette and to tension said length of cable whereby the clamps are both brought in contact with the sides of said film cassette.

18. The apparatus of claim 17 wherein:
 a. said interconnection system includes a pulley carried by said support means at a position outwardly of said one clamp;
 b. said length of cable is reeved around said pulley so as to define two cable reaches which move in generally opposite directions;
 c. one of said cable reaches being rigidly coupled to said one clamp; and,
 d. the other of said reaches being rigidly coupled to the other of said clamps.

19. The apparatus of claim 18 wherein:
 a. said interconnection system further includes a second length of cable reeved around a second pulley carried by said support structure;
 b. said second pulley being disposed outwardly of said other clamp; and,
 c. said second length of cable coupling at opposite ends to said clamps and including at least one resilient portion for maintaining said second length of cable taunt.

20. The apparatus of claim 17 wherein said locking means includes eccentric means for releasably locking said one clamp against movement away from the cassette being clamped and thereafter being operative to compress said one clamping means against the cassette thereby tensioning said length of cable and drawing said other clamp firmly against the cassette.

21. The apparatus of claim 20 wherein said clamps each carry a resilient element which makes contact with the cassette being clamped during the clamping of the cassette, said eccentric means being operable to compress said resilient elements against the cassette to firmly clamp the cassette.

* * * * *